(12) United States Patent
Cai et al.

(10) Patent No.: US 9,431,059 B2
(45) Date of Patent: Aug. 30, 2016

(54) INFORMATION PROCESSING METHOD AND ELECTRONIC DEVICE THEREOF

(71) Applicants: Beijing Lenovo Software LTD., Beijing (CN); Lenovo (Beijing) Limited, Beijing (CN)

(72) Inventors: Mingxiang Cai, Beijing (CN); Xiaoping Zhang, Beijing (CN); Lu Cao, Beijing (CN)

(73) Assignees: Beijing Lenovo Software LTD., Beijing (CN); Lenovo (Beijing) Limited, Beijing (CN)

( * ) Notice: Subject to any disclaimer, the term of this patent is extended or adjusted under 35 U.S.C. 154(b) by 75 days.

(21) Appl. No.: 14/227,475

(22) Filed: Mar. 27, 2014

(65) Prior Publication Data

US 2015/0117834 A1    Apr. 30, 2015

(30) Foreign Application Priority Data

Oct. 31, 2013  (CN) .......................... 2013 1 0533598

(51) Int. Cl.

| | |
|---|---|
| *H04N 9/80* | (2006.01) |
| *H04N 5/93* | (2006.01) |
| *G11B 27/34* | (2006.01) |
| *G06F 3/0354* | (2013.01) |
| *G11B 27/30* | (2006.01) |
| *H04N 5/445* | (2011.01) |
| *H04N 5/783* | (2006.01) |
| *H04N 21/472* | (2011.01) |
| *H04N 21/845* | (2011.01) |
| *G11B 27/00* | (2006.01) |
| *G06F 3/00* | (2006.01) |
| *H04N 9/82* | (2006.01) |

(52) U.S. Cl.
CPC ........... *G11B 27/34* (2013.01); *G06F 3/03543* (2013.01); *G11B 27/30* (2013.01); *H04N 5/44513* (2013.01); *H04N 5/783* (2013.01); *H04N 9/8227* (2013.01); *H04N 21/47217* (2013.01); *H04N 21/8456* (2013.01); *H04N 9/8205* (2013.01)

(58) Field of Classification Search
USPC ........ 386/239, 248, 278, 282, 280; 715/700, 715/716, 719, 722, 732, 733
See application file for complete search history.

(56) References Cited

U.S. PATENT DOCUMENTS

| 8,774,605 | B2 * | 7/2014 | Nagasaki ...................... 386/289 |
| 2014/0201632 | A1 * | 7/2014 | Kunigita et al. .............. 715/716 |

FOREIGN PATENT DOCUMENTS

WO    WO2012/160895    * 11/2012 ............. G06F 13/00

*Primary Examiner* — Daquan Zhao
(74) *Attorney, Agent, or Firm* — Westman, Champlin & Koehler, P.A.

(57) ABSTRACT

An information processing method applied in an electric device is disclosed. The method comprises: acquiring at least one play parameter for characterizing a playing history of a first video from the network side and/or a storage unit of an electric device; generating and displaying a play progress bar corresponding to the first video on a display unit of the electric device based on the at least one play parameter, wherein the play progress bar has at least a first portion displayed in a first pattern and a second portion displayed in a second pattern different from the first pattern. Such solution provided by the invention provides a new display approach for the play progress bar, and addresses the technical problem that a video can only be segmented or prompted by the play progress bar of the video according to the content of the video. This new display method of the play progress bar does not depend on the content of the video itself and may reflect intuitively how much the user who once played a video is interested in different segments of the video.

4 Claims, 2 Drawing Sheets

---

ACQUIRE AT LEAST ONE PLAY PARAMETER FOR CHARACTERIZING A PLAYING HISTORY OF A FIRST VIDEO FROM THE NETWORD SIDE AND/OR A STORAGE UNIT OF AN ELECTRIC DEVICE — S101

GENERATE AND DISPLAY A PLAY PROGRESS BAR CORRESPONDING TO THE FIRST VIDEO ON A DISPLAY UNIT OF THE ELECTRIC DEVICE BASED ON THE AT LEAST ONE PLAY PARAMETER, WHEREIN THE PLAY PROGRESS BAR HAS AT LEAST A FIRST PORTION DISPLAYED IN A FIRST PATTERN AND A SECOND PORTION DISPLAYED IN A SECOND PATTERN DIFFERENT FROM THE FIRST PATTERN — S102

INFORMATION PROCESSING METHOD AND ELECTRONIC DEVICE THEREOF

CROSS-REFERENCE TO RELATED APPLICATION

This Application is a non-provisional Application of Chinese Application No. CN 201310533598.6, filed Oct. 31, 2013, in Chinese, the contents of which are hereby incorporated by reference in their entirety.

TECHNICAL FIELD

The invention relates to the information processing field and, in particular, to an information processing method and an electric device thereof.

BACKGROUND

With the popularity of electric devices such as the smart phone, the tablet computer, the notebook computer, the Smart TV, etc., videos supported by these electric devices are increasingly coming in to the work and life of people, for example, vast of network videos, remote education videos, video conference, etc.

Currently, taking a notebook computer as an example, in order to facilitate the viewing of a user, the video with a long duration, such as a teleplay with a duration of 60 minutes for one episode, is typically divided into a plurality of segments such as titles, chapter 1, chapter 2, chapter 3 and the end according to the video content. These segments are displayed on the play progress bar of the video by separators. When the user moves a mouse onto one of the separators, a corresponding heading, such as titles, will be displayed.

Furthermore, in order to facilitate the user in viewing the video content at each time point, when the user moves a mouse onto some position of the play progress bar which, for example, corresponds to a time point of 32 m: 45 s, a video picture corresponding to that time point (i.e., 32 m: 45 s) will be automatically displayed.

In the implementation of the solutions of the embodiments of the application, inventors of the application found the following technical problems.

Since the play progress bar of the video is segmented or prompted according to the content of the video such as chapters or pictures of the video, a technical problem that a video can only be segmented or prompted by the play progress bar of the video according to the content of the video occurs.

Currently, the user experience is decreased because the user has to move the mouse onto a corresponding position of the play progress bar of the video when he/she wants to know the segmented or prompted content.

SUMMARY

Embodiments of the application provide an information processing method and an electric device thereof to provide a new display approach for a play progress bar, capable of addressing the technical problem that a video can only be segmented or prompted by the play progress bar of the video according to the content of the video.

Embodiments of the application provide an information processing method applied in an electric device, the method comprising:

acquiring at least one play parameter for characterizing a playing history of a first video from the network side and/or a storage unit of the electric device; and generating and displaying a play progress bar corresponding to the first video on a display unit of the electric device based on the at least one play parameter, wherein the play progress bar has at least a first portion displayed in a first pattern and a second portion displayed in a second pattern different from the first pattern.

Alternatively, acquiring at least one play parameter for characterizing a playing history of a first video from the network side and/or a storage unit of the electric device further comprises:

acquiring a first operation parameter for characterizing a first operation of a user during the play of the first video from the network side and/or the storage unit, the first operation parameter comprising a first video timing and a second video timing after the first video timing, wherein the first video timing is a video playing timing at which the user starts performing the first operation, and the second video timing is a video playing timing at which the user stops performing the first operation.

Alternatively, said generating and displaying a play progress bar corresponding to the first video on a display unit of the electric device based on the at least one play parameter further comprises:

generating the play progress bar based on the at least one play parameter, displaying the play progress bar between the first video timing and the second video timing in the first pattern, and displaying the play progress bar before the first video timing and after the second video timing in the second pattern.

Alternatively, said acquiring at least one play parameter for characterizing a playing history of a first video from the network side and/or a storage unit of the electric device further comprises:

acquiring a first operation parameter for characterizing a first operation of a user during the play of the first video from the network side and/or the storage unit, the first operation parameter comprising a first video timing and a second video timing after the first video timing;

acquiring a number of times for which the first video has been played;

acquiring a number of times for which the first operation has been performed during a period between a third video timing and a fourth video timing; and acquiring a first ratio of the playing number of times to the performing number of times, wherein the first video timing is a video playing timing at which the user starts performing the first operation, the second video timing is a video playing timing at which the user stops performing the first operation, the third video timing is a video playing timing before the first video timing, and the forth video timing is a video playing timing after the first video timing and before the second video timing.

Alternatively, said generating and displaying a play progress bar corresponding to the first video on a display unit of the electric device based on the at least one play parameter further comprises:

determining whether the first ratio is larger than a predefined ratio, to obtain a first determination result; and generating the play progress bar when the first determination result indicates that the first ratio is equal to or larger than the predefined ratio, displaying the play progress bar between the first video timing and the second video timing in the first pattern, and displaying the play progress bar before the first video timing and after the second video timing in the second pattern.

Embodiments of the application also provide an electric device comprising:

a first acquiring unit, configured to acquire at least one play parameter for characterizing a playing history of a first video from the network side and/or a storage unit of the electric device; and a first processing unit, configured to generate and display a play progress bar corresponding to the first video on a display unit of the electric device based on the at least one play parameter, wherein the play progress bar at least has a first portion displayed in a first pattern and a second portion displayed in a second pattern different from the first pattern.

Alternatively, the first acquiring unit further comprises:

a first acquiring sub-unit, configured to acquire a first operation parameter for characterizing a first operation of a user during the play of the first video from the network side and/or the storage unit, the first operation parameter comprising a first video timing and a second video timing after the first video timing, wherein the first video timing is a video playing timing at which the user starts performing the first operation, and the second video timing is a video playing timing at which the user stops performing the first operation.

Alternatively, the first processing unit further comprises:

a play progress bar processing unit, configured to generate the play progress bar based on the at least one play parameter, to display the play progress bar between the first video timing and the second video timing in the first pattern, and to display the play progress bar before the first video timing and after the second video timing in the second pattern.

Alternatively, the first acquiring unit further comprises:

a first acquiring sub-unit, configured to acquire a first operation parameter for characterizing a first operation of a user during the play of the first video from the network side and/or the storage unit, the first operation parameter comprising a first video timing and a second video timing after the first video timing;

a second acquiring sub-unit, configured to acquire a number of times for which the first video has been played;

a third acquiring sub-unit, configured to acquire a number of times for which the first operation has been performed during a period between a third video timing and a fourth video timing; and a fourth acquiring sub-unit, configured to acquire a first ratio of the playing number of times to the performing number of times, wherein the first video timing is a video playing timing at which the user starts performing the first operation, the second video timing is a video playing timing at which the user stops performing the first operation, the third video timing is a video playing timing before the first video timing, and the forth video timing is a video playing timing after the first video timing and before the second video timing.

Alternatively, the first processing unit further comprises:

a first determination sub-unit, configured to determine whether the first ratio is larger than a predefined ratio, to obtain a first determination result; and a second processing sub-unit, configured to generate the play progress bar when the first determination result indicates that the first ratio is equal to or larger than the predefined ratio, to display the play progress bar between the first video timing and the second video timing in the first pattern, and to display the play progress bar before the first video timing and after the second video timing in the second pattern.

One or more of the solutions provided by embodiments of the application at least have the following technical effects or advantages.

1. The electric device in the application obtains at least one parameter for characterizing the playing history of the first video, and generates and displays a play progress bar corresponding to the first video on a display unit of the electric device based on the at least one play parameter. Because the play progress bar is generated and displayed according to the playing history of the video, it does not depend on the content of the video itself. Therefore, the solutions according to the embodiments of the application efficiently address the technical problem that a video can only be segmented or prompted by the play progress bar of the video according to the content of the video, and provides a new display method of the play progress bar which does not depend on the content of the video itself and may reflect intuitively how much the users who once played a video are interested in different segments of the video.

2. Since, in the embodiments of the application, the play progress bar between the first video timing and the second video timing is displayed in the first pattern and the play progress bar before the first video timing and after the second video timing is displayed in the second pattern during the process for playing the video, the play progress bar can clearly indicate which of the segments the user played the last time and which of the segments the user has not played. For example, in his/her first play of the video, the user may play the video from the starting timing to the first video timing, fast forward to the second video timing and continue the play until the ending timing of the video. Thereby, when the user opens the video the second time, the display progress bar between the first video timing and the second video timing may be displayed in red, and the play progress bar between the starting time and the first video timing and the play progress bar between the second video timing and the ending timing may be displayed in green. The play progress bar can clearly indicate the video segments displayed by the user by displaying these segments in a different pattern, enabling the user to know the viewed and the unviewed video segments, which improves the user experience.

3. The user needs not to move the mouse to a corresponding play progress bar to acquire corresponding content because the embodiments of the application display on the play progress bar the contents to be displayed directly, making the operations on the video easier and improving the user experience.

4. The embodiments of the application generate the play progress bar when the first ratio is equal to or larger than the predefined ratio, display the play progress bar between the first video timing and the second video timing in the first pattern, and display the play progress bar before the first video timing and after the second video timing in the second pattern. The play progress bar of the video can thus reflect intuitively how much the users who once played a video are interested in different segments of the video. For example, as for the segments played by more than 80% of users, its corresponding play progress bar is displayed in green, while, as for the segments not played by more than 80% of users, its corresponding play progress bar is displayed in red, whereby a user may intuitively know which of the segments have been viewed by most of people and which of the segments are rarely viewed by most of people. As a result, the user may selectively view the video according to the prompt on the display progress bar, which improves the user experience.

DETAILED DESCRIPTION OF THE EMBODIMENTS

The embodiments of the application provide an information processing method and an electric device thereof, capable of addressing the technical problem that a video can only be segmented or prompted by the play progress bar of the video according to the content of the video.

The general idea of the solutions according to the embodiments of the application for addressing the above technical problem is as follows.

The electric device in the application acquires at least one play parameter for characterizing a playing history of a first video from the network side and/or a storage unit of the electric device; then generates and displays a play progress bar corresponding to the first video on a display unit of the electric device based on the at least one play parameter, the play progress bar at least having a first portion displayed in a first pattern and a second portion displayed in a second pattern different from the first pattern. Since the play progress bar is generated and displayed according to the playing history of the video, it does not depend on the content of the video itself. Consequently, the solutions according to the embodiments of the application efficiently address the technical problem that a video can only be segmented or prompted by the play progress bar of the video according to the content of the video.

The solution of the invention will be described below in detail by means of figures and embodiments. It should be understood that the embodiments of the application and specific features therein are only the detail description of, rather than the limitation to, the solution of the invention. The embodiments of the application and technical features therein can be combined in any way if they do not conflict with each other.

Figure 1:
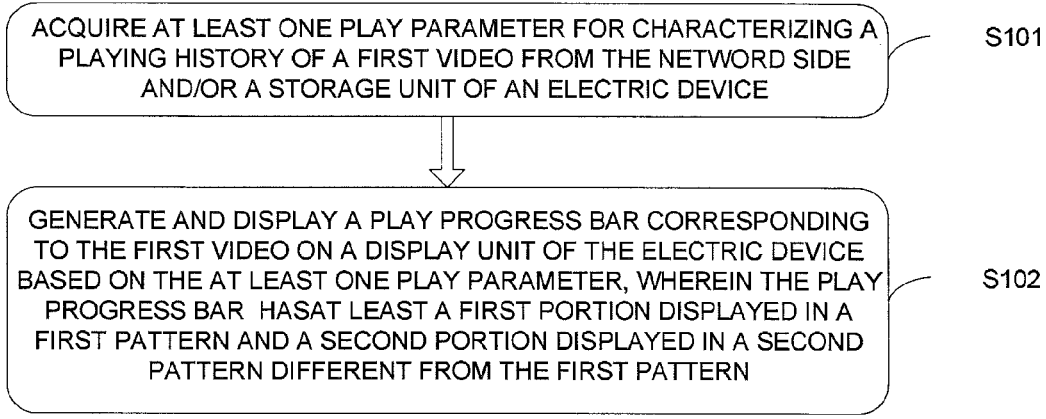
FIG. 1 is a flow diagram of an information processing method according to an embodiment of the application.

Referring to FIG. 1, an embodiment of the application provides an information processing method applied in an electric device.

Particularly, the electric device may be the one can play videos, such as smart phone, tablet computer and notebook computer.

The information processing method according to an embodiment of the application, as shown in FIG. 1, comprises:

Step S101: acquiring at least one play parameter for characterizing a playing history of a first video from the network side and/or a storage unit of the electric device;

Step S102: generating and displaying a play progress bar corresponding to the first video on a display unit of the electric device based on the at least one play parameter, wherein the play progress bar has at least a first portion displayed in a first pattern and a second portion displayed in a second pattern different from the first pattern.

In the detail implementation, the way for generating and displaying a play progress bar corresponding to the first video on a display unit of the electric device based on the at least one play parameter in S102 may be different based on different parameters acquired in S101. Two determination approaches are listed as below in the embodiment of the application. Of course, the embodiments of the application are not limited to the following two approaches in a particular implementation.

First Approach

The at least one play parameter for characterizing a playing history of a first video acquired in S101 are video timings corresponding to different user operations.

Particularly, the first operation parameter for characterizing a first operation of a user acquired during the play of the first video from the network side and/or the storage unit comprises a first video timing and a second video timing after the first video timing, wherein the first video timing is a video playing timing at which the user starts performing the first operation, and the second video timing is a video playing timing at which the user stops performing the first operation.

In the embodiments of the application, the first operation may be operations on the video such as fast-forward, rewind, stop, etc.

In an example where a user is playing a movie with a duration of 1 hour and 45 minutes and the first operation on the movie is fast-forward, when the current playing timing of the movie is 24 m: 30 s and the user fast forwards the video to 30 m: 45 s, it is determined that the first video timing is 24 m: 30 s and the second video timing is 30 m: 45 s.

In another example where a user is playing the same movie and the first operation is to stop the playing, when the user continues his/her playing to 1 h: 17 m: 2 s, the user closes the current movie video. In this case, it is determined that the first video timing is 1 h: 17 m: 2 s and the second video timing is the video ending timing.

After S101, in order to enable the play progress bar to clearly indicate the segments played by the user so that the user can clearly know which of the segments have been played and which ones have not, S102 is performed to generate and display a play progress bar corresponding to the first video on a display unit of the electric device based on the at least one play parameter, wherein the play progress bar has at least a first portion displayed in a first pattern and a second portion displayed in a second pattern different from the first pattern.

Particularly, the play progress bar is generated based on the at least one play parameter, the play progress bar between the first video timing and the second video timing is displayed in the first pattern, and the play progress bar before the first video timing and after the second video timing is displayed in the second pattern.

In an embodiment, in the video playing process, the user may perform the fast-forward and rewind many times, or simultaneously perform the operations such as fast-forward, rewind, stop, etc.

For example, when the current video playing timing of a movie is 24 m: 30 s, the user fast forwards the video to 30 m: 45 s, continues his/her playing to 1 h: 17 m: 2 s, and then closes the current movie video. Suppose that the gray represents the segments that have been played and the blue represents the segments that have not been played, when the user wants to play the unfinished movie and opens the movie video once again, the play progress bar of the video is displayed as follows: the play progress bar between the video stating timing and 24 m: 30 s and the play progress bar between 30 m: 45 s and 1 h: 17 m: 2 s are displayed in gray, and the play progress bar between 24 m: 30 s and 30 m: 45 s and the play progress bar after 1 h: 17 m: 2 s are displayed in blue.

By displaying the play progress bar differently as above, the user may clearly know which of the segments have been played and which ones have not.

Second Approach

Figure 2:
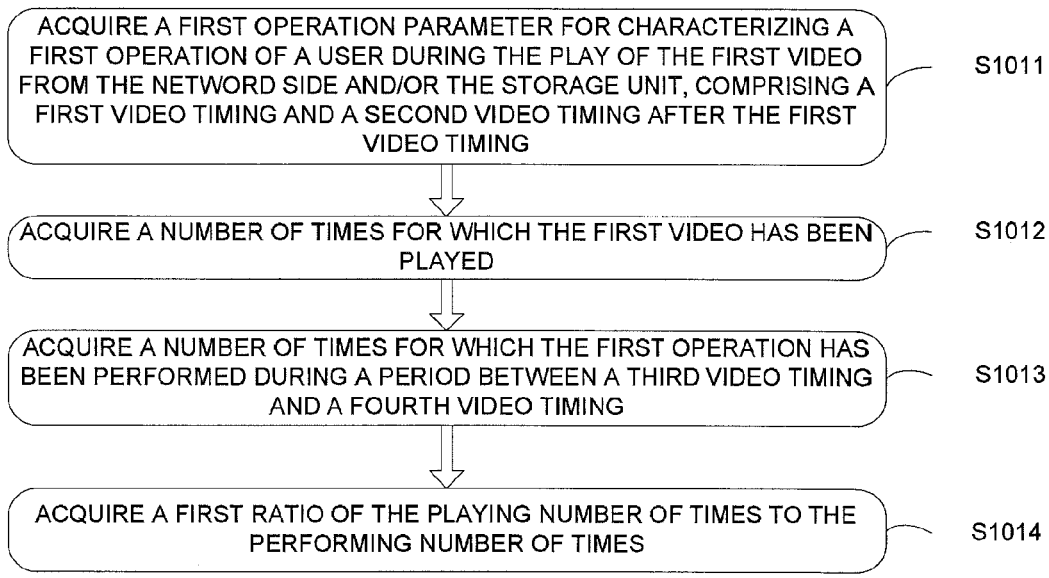
FIG. 2 is a flow diagram of a particular implementation of S101 in the second approach according to an embodiment of the application.

In an embodiment of the application, in order to generate and display the play progress bar of a video based on the play progresses of all the users who have played the same video, as shown in FIG. 2, S101 further includes the following four steps.

At step S1011, a first operation parameter for characterizing a first operation of a user is acquired during the play of the first video from the network side and/or the storage unit, the first operation parameter comprising a first video timing and a second video timing after the first video timing.

This step is the same as that in the first approach.

At step S1012, a number of times for which the first video has been played is acquired.

In the embodiment of the application, the first video may be any video available to the user, such as movies, network courses, vodcaster videos, etc. The playing number of times of the first video may be up to 500, 50,000 or 5,000,000.

In a particular implementation, the playing number of times for a video increases by one once an electric device starts to play the video. For example, if a user opens a network course video, plays it to 2 seconds, and then closes the network course video, the playing number of times of the network course video increases by one.

At step S1013, a number of times for which the first operation has been performed during a period between a third video timing and a fourth video timing is acquired.

The third video timing is a video playing timing before the first video timing, and the forth video timing is a video playing timing after the first video timing and before the second video timing.

Particularly, when the current playing timing of the movie is 24 m: 30 s and the user fast forwards the video to 30 m: 45 s, the performing number of times of the first operation acquired by the electric device is 1. Furthermore, the system will determine the third video timing and the fourth video timing according to the first video timing.

In S1013, the third video timing and the fourth video timing may be determined according to a predefined time difference.

Particularly, the predefined time difference may be determined according to the duration of the video, and the third video timing is equal to the first video timing minus the time difference, and the fourth video timing is equal to the first video timing plus the predefined time difference.

For example, in a case that the duration of a movie is 2 hours, the predefined time difference may be 30 seconds. For the above example where the first video timing is 24 m: 30 s, the third video timing is 24 m: 30 s minus 30 seconds, i.e. 24 minutes, and the fourth video timing is 24 m: 30 s plus 30 seconds, i.e. 25 minutes.

As another example, in a case that the duration of a vodcaster video is 29 m: 12 s, the predefined time difference may be 5 seconds. Supposing the acquired first video timing is 10 m: 34 s, the third video timing is 10 m: 29 s, and the fourth video timing is 10 m: 39 s.

In the embodiment of the application, after the third video timing and the fourth video timing have been determined, the number of times for which the first operation has been performed during the period between the third video timing and the fourth video timing can be determined.

Particularly, for the above example where the first video timing of the vodcaster video is 10 m: 34 s, the corresponding third video timing is 10 m: 29 s, and the fourth video timing is 10 m: 39 s, suppose that the number of times for which the first operation has been performed at the first video timing (i.e. 10 m: 34 s) is 3576, and the numbers of times at following ten timings (i.e. 10 m: 29 s, 10 m: 30 s, 10 m: 31 s, 10 m: 32 s, 10 m: 33 s, 10 m: 34 s, 10 m: 35 s, 10 m: 36 s, 10 m: 37 s, 10 m: 38 s, and 10 m: 39 s) are 5, 56, 76, 450, 324, 67, 564, 354, 0 and 25 respectively, then the performing number of times is the performing number of times at the first video timing plus the performing numbers of times at all the timings during the period between the third video timing and the fourth video timing, i.e. 5497.

In a particular implementation, S1012 and S1013 may be performed one after another, or performed simultaneously.

In the embodiment of the application, after the playing number of times and the performing number of times are acquired, step S1014 is performed to acquire a first ratio of the playing number of times to the performing number of times.

Particularly, for the above example where the performing number of times is 5497, suppose that the acquired playing number of times of the video is 6754, the first ratio is obtained by dividing the playing number of times by the performing number of times and multiplying it by 100%. In the case that two decimal places are reserved, the first ratio is 81.39%.

Figure 3:
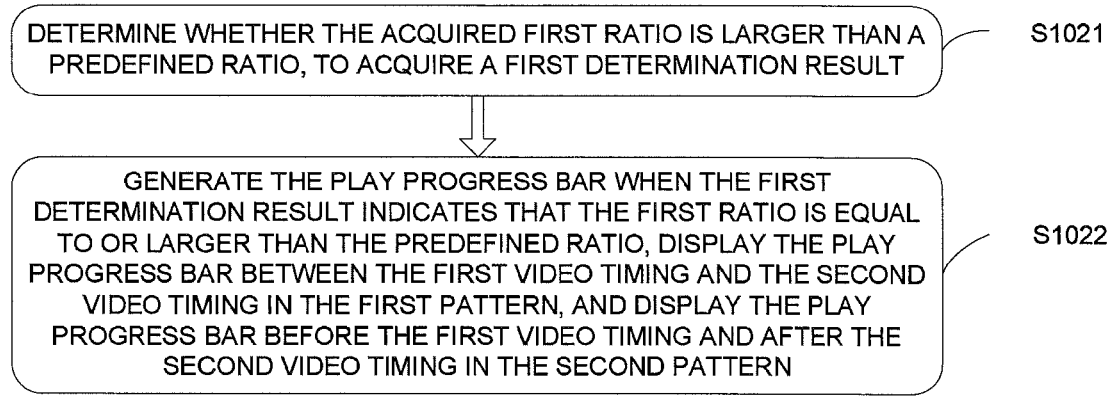
FIG. 3 is a flow diagram of a particular implementation of S102 in the second approach according to an embodiment of the application.

After S101, in order to determine the display status of the play progress bar corresponding to different video segments, S102 is performed to generate and display a play progress bar corresponding to the first video on a display unit of the electric device based on the at least one play parameter, wherein the play progress bar has at least a first portion displayed in a first pattern and a second portion displayed in a second pattern different from the first pattern. Referring to FIG. 3, step S102 further includes the following two steps:

S1021, determining whether the acquired first ratio is larger than a predefined ratio, to obtain a first determination result.

S1022: generating the play progress bar when the first determination result indicates that the first ratio is equal to or larger than the predefined ratio, displaying the play progress bar between the first video timing and the second video timing in the first pattern, and displaying the play progress bar before the first video timing and after the second video timing in the second pattern.

Particularly, depending on the different video play habit of a user, the predefined ratio of the electric device may be 70%, or 85%.

In the embodiment of the application, for the above example where the acquired first ratio is 81.39%, the first ratio is larger than the predefined ratio when the predefined ratio is 70%, or the first ratio is smaller than the predefined ratio when the predefined ratio is 85%.

Then, after S1021, S1022 and S1023 are preformed according to the first determination result (i.e. whether the first ratio is larger than the predefined ratio) to determine the display states of the play progress bar.

Particularly, when the first determination result indicates that the first ratio is equal to or larger than the predefined ratio, the play progress bar is generated and displayed on the display unit with a first state.

The first state differentiates play progress bars between different video playing timings by utilizing different colors, different widths and so on, while the patterns of the play progress bars are the same at every video playing timing in a second state.

Particularly, S1022 includes: generating the play progress bar when the first determination result indicates that the first ratio is equal to or larger than the predefined ratio, displaying the play progress bar between the first video timing and the second video timing in the first pattern, and displaying the play progress bar before the first video timing and after the second video timing in a second pattern different from the first pattern.

In a particular implementation, the second video timing can be determined according to the ratio of different video playing timings at which users stop performing the first operation. For the example where the performing number of times is 5497 and the first video timing is 10 m: 34 s, suppose that in the above 5497 first operations, there are 3467 times the users stop performing the first operation at the video playing timing of 14 m: 36 s, which is 63.07% of the total performing number of times, then the determined second video timing may be 14 m: 36 s. As another example, in the above 5497 first operations, there are 1379 times the users stop performing the first operation at the video playing timing of 14 m: 36 s, 1257 times the users stop performing the first operation at the video playing timing of 14 m: 37 s, 1043 times the users stop performing the first operation at the video playing timing of 14 m: 38 s, and the left video playing timings at which the users stop performing the first operation are decentralized and repeat no more than 500 times, the determined second video timing may be any of 14 m: 36 s, 14 m: 37 s, and 14 m: 38 s because the display effect of the play progress bar would not be affected substantially. The difference is not important to the users.

In a practical application, in order to show clearly the display states of the play progress bar, the first pattern may be that the filled color of the play progress bar is red, while the second pattern may be that the filled color of the play progress bar is green, or the first pattern may be that the width of the play progress bar is 2 mm, while the second pattern may be that the width of the play progress bar is 1 mm.

Particularly, if colors are used for differentiating the patterns, the play progress bar between the first video timing and the second video timing is displayed in green, and the play progress bar before the first video timing and the play progress bar after the second video timing are displayed in red.

The information processing method of the invention will be described by 3 particular embodiments. It should be explained that the embodiments in the invention are only used to explain the invention, rather than to limit the invention. Any embodiment complying with the concept of the invention should be in the protection scope of the invention, and it is obvious to one with ordinary skills in the art how to make a variant according to the concept of the invention.

Embodiment 1

For example, the electric device is a notebook computer, the first video is a movie and the duration of the movie is 2 h: 3 m: 25 s.

Firstly, the user opens the movie video and begins to play it. When the video is played to 25 m: 17 s, the user fast forwards the video to 36 m: 23 s. When the movie is played to 39 m: 18 s, the user rewinds the movie back to 30 m: 06 s if the user finds he/she cannot understand this movie, and continuously plays the movie until 1 h: 36 m: 45 s at which the user stops the played movie video.

Suppose the gray represents the segments that have been played and the blue represents the segments that have not been played. When the user opens the movie video the second time, the play progress bar of the video is displayed as follows: the play progress bar between the video stating timing and 25 m: 17 s and the play progress bar between 30 m: 06 s and 1 h: 36 m: 45 s are displayed in gray, and the play progress bar between 25 m: 17 s and 30 m: 06 s and the play progress bar after 1 h: 36 m: 45 s are displayed in blue.

Consequently, when the user opens the video the second time, he/she may clearly know which of the segments have been played and which of the segments have not been played.

Embodiment 2

For example, the electric device is a notebook computer, the first video is a movie and the duration of the movie is 2 h: 3 m: 25 s.

Firstly, the user opens the movie video and the acquired playing number of times of the video now is increased by one, i.e. 54768. When the movie is played to 53 m: 10 s, most of the users will fast forward the movie at about 53 m: 10 s because the picture is fairly horrible, and thus the first video timing is acquired as being 53 m: 10 s. The second video timing is determined as 55 m: 2 s according to the different ratios of video playing timings at which users stop the fast-forward. In the case that the predefined time difference of the system is 5 seconds, the third video timing is the first video timing minus the predefined time difference, i.e. 53 m: 5 s, and the fourth video timing is the first video timing plus the predefined time difference, i.e. 53 m: 15 s. Furthermore, the number of times for which the first operation has been performed (i.e. the performing number of times) during the period between the third video timing (i.e. 53 m: 5 s) and the fourth video timing (i.e. 53 m: 15 s) is acquired as being 42230, and then the first ratio of the performing number of times to the playing number of times is acquired, i.e. 77.12%.

Furthermore, in the case that the predefined ratio of the system is 75.00%, the first ratio is larger than the predefined ratio, and the generated and displayed play progress bars are as follows: the play progress bar between the video starting timing and the first video timing (53 m: 10 s) is displayed in green, the play progress bar between the first video timing (53 m: 10 s) and the second video timing (55 m: 2 s) is displayed in red, and the play progress bar between the second video timing and the video ending timing is displayed in green.

Embodiment 3

As described in Embodiment 1, suppose a first one of the first ratio is 77.12% and a second one of the first ratio is 67.34%, the corresponding first video timing and second video timing are 1 h: 10 m: 10 s and 1 h: 15 m: 10 s, respectively.

Furthermore, the predefined ratio of the system is 65.00%. When the first ratio is above 65%, the corresponding play progress bar is displayed in red and the other play progress bars are displayed in green.

In this case, the generated and displayed play progress bars are as follows: the play progress bar between the video starting timing and 53 m: 10 s is displayed in green, the play progress bar between 53 m: 10 s and 55 m: 2 s is displayed in red, the play progress bar between 55 m: 2 s and 1 h: 10 m: 10 s is displayed in green, the play progress bar between 1 h: 10 m: 10 s and 1 h: 15 m: 10 s is displayed in red, and the play progress bar between 1 h: 15 m: 10 s and the video ending timing is displayed in green.

Figure 4:
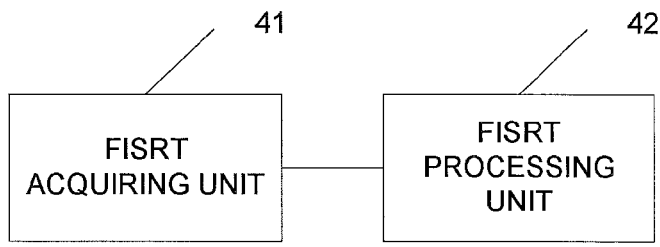
FIG. 4 is a block diagram of the structure of an electric device according to an embodiment of the application.

Referring to FIG. 4, embodiments of the application also provide an electric device which includes:

a first acquiring unit 41, configured to acquire at least one play parameter for characterizing a playing history of a first video from the network side and/or a storage unit of the electric device; and a first processing unit 42, configured to generate and display a play progress bar corresponding to the first video on a display unit of the electric device based on the at least one play parameter, wherein the play progress bar has at least a first portion displayed in a first pattern and a second portion displayed in a second pattern different from the first pattern.

In the embodiments, the first processing unit 42 may generate and display a play progress bar corresponding to the first video on a display unit of the electric device based on the at least one play parameter in different ways based on different parameters acquired by the first acquiring unit 41. Two determination approaches are listed as below in the embodiment of the application. However, the embodiments of the application are not limited to the following two approaches in a particular implementation.

First Approach

For the same video, in order to show which of the segments were played by a user and which of the segments were not played according to the last playing of the user, the first acquiring unit 41 further includes:

a first acquiring sub-unit, configured to acquire a first operation parameter for characterizing a first operation of the user during the play of the first video from the network side and/or the storage unit, the first operation parameter comprising a first video timing and a second video timing after the first video timing, wherein the first video timing is a video playing timing at which the user starts performing the first operation, and the second video timing is a video playing timing at which the user stops performing the first operation.

Alternatively, in order to enable the play progress bar to clearly show the segments played by the user, the first processing unit 42 further comprises:

a play progress bar processing unit, configured to generate the play progress bar based on the at least one play parameter, to display the play progress bar between the first video timing and the second video timing in the first pattern, and to display the play progress bar before the first video timing and after the second video timing in the second pattern.

Second Approach

In order to generate and display the play progress bar of a video according to the playing history of all the users who once played the same video, the first acquiring unit 41 further comprises:

a first acquiring sub-unit, configured to acquire a first operation parameter for characterizing a first operation of a user during the play of the first video from the network side and/or the storage unit, the first operation parameter comprising a first video timing and a second video timing after the first video timing;

a second acquiring sub-unit, configured to acquire a number of times for which the first video has been played;

a third acquiring sub-unit, configured to acquire a number of times for which the first operation has been performed during a period between a third video timing and a fourth video timing; and a fourth acquiring sub-unit, configured to acquire a first ratio of the playing number of times to the performing number of times, wherein the first video timing is a video playing timing at which the user starts performing the first operation, the second video timing is a video playing timing at which the user stops performing the first operation, the third video timing is a video playing timing before the first video timing, and the forth video timing is a video playing timing after the first video timing and before the second video timing.

Alternatively, in order to determine the display states of play progress bars corresponding to different video segments, the first processing unit 42 further comprises:

a first determination sub-unit, configured to determine whether the first ratio is larger than a predefined ratio, to obtain a first determination result; and a second processing sub-unit, configured to generate the play progress bar when the first determination result indicates that the first ratio is equal to or larger than the predefined ratio, to display the play progress bar between the first video timing and the second video timing in the first pattern, and to display the play progress bar before the first video timing and after the second video timing in the second pattern.

The electric device according to the embodiment can achieve the method described above. The detail operation process of the electric device in the embodiment will not be described in details.

One or more of the following technical effects may be achieved by one or more of the solutions in embodiments of the application.

1. The electric device in the application obtains at least one parameter for characterizing the playing history of the first video, and generates and displays a play progress bar corresponding to the first video on a display unit of the electric device based on the at least one play parameter. Because the play progress bar is generated and displayed according to the playing history of the video, it does not depend on the content of the video itself. Therefore, the solutions according to the embodiments of the application efficiently address the technical problem that a video can only be segmented or prompted by the play progress bar of the video according to the content of the video, and provides a new display method of the play progress bar which does not depend on the content of the video itself and may reflect intuitively how much the user who once played a video is interested in different segments of the video.

2. Since, in the embodiments of the application, the play progress bar between the first video timing and the second video timing is displayed in the first pattern and the play progress bar before the first video timing and after the second video timing is displayed in the second pattern during the process for playing the video, the play progress bar can clearly indicate which of the segments the user played the last time and which of the segments the user has not played. For example, in his/her first play of the video, the user may play the video from the starting timing to the first video timing, fast forward to the second video timing and continue the play until the ending timing of the video. Thereby, when the user opens the video the second time, the display progress bar between the first video timing and the second video timing may be displayed in red, and the play progress bar between the starting time and the first video timing and the play progress bar between the second video timing and the ending timing may be displayed in green. The play progress bar can clearly indicate the video segments displayed by the user by displaying these segments in a different pattern, enabling the user to know the viewed and the unviewed video segments, which improves the user experience.

3. The user needs not to move the mouse to a corresponding play progress bar to acquire corresponding content because the embodiments of the application display on the play progress bar the contents to be displayed directly, making the operations on the video easier and improving the user experience.

4. The embodiments of the application generate the play progress bar when the first ratio is equal to or larger than the predefined ratio, display the play progress bar between the first video timing and the second video timing in the first pattern, and display the play progress bar before the first video timing and after the second video timing in the second pattern. The play progress bar of the video can thus reflect intuitively how much the users who once played a video are interested in different segments of the video. For example, as for the segments played by more than 80% of users, its corresponding play progress bar is displayed in green, while, as for the segments not played by more than 80% of users, its corresponding play progress bar is displayed in red, whereby a user may intuitively know which of the segments have been viewed by most of people and which of the segments are rarely viewed by most of people. As a result, the user may selectively view the video according to the prompt on the display progress bar, which improves the user experience.

Obviously, one with ordinary skills in the art may make various modifications and variants on the invention without departing from the spirit and scope of the invention. Thereby, if these modifications and variants on the invention are within the scope of claims of the invention and equivalent technologies thereof, these modifications and variants are intended to be comprised in the invention.

What is claimed is:

1. An information processing method applied in an electric device, the method comprising:
    acquiring at least one play parameter for characterizing a playing history of a first video from the network side and/or a storage unit of the electric device; and
    generating and displaying a play progress bar corresponding to the first video on a display unit of the electric device based on the at least one play parameter,
    wherein the play progress bar at least has a first portion displayed in a first pattern and a second portion displayed in a second pattern different from the first pattern,
    wherein acquiring at least one play parameter for characterizing a playing history of a first video from the network side and/or a storage unit of the electric device further comprises:
    acquiring a first operation parameter for characterizing a first operation of a user during the play of the first video from the network side and/or the storage unit, the first operation parameter comprising a first video timing and a second video timing after the first video timing;
    acquiring a number of times for which the first video has been played;
    acquiring a number of times for which the first operation has been performed during a period between a third video timing and a fourth video timing; and
    acquiring a first ratio of the playing number of times to the performing number of times, wherein the first video timing is a video playing timing at which the user starts performing the first operation, the second video timing is a video playing timing at which the user stops performing the first operation, the third video timing is a video playing timing before the first video timing, and the forth video timing is a video playing timing after the first video timing and before the second video timing, and
    wherein generating and displaying a play progress bar corresponding to the first video on a display unit of the electric device based on the at least one play parameter further comprises: determining whether the first ratio is larger than a predefined ratio, to obtain a first determination result; and
    generating the play progress bar when the first determination result indicates that the first ratio is equal to or larger than the predefined ratio, displaying the play progress bar between the first video timing and the second video timing in the first pattern, and displaying the play progress bar before the first video timing and after the second video timing in the second pattern.

2. The method of claim wherein generating and displaying a play progress bar corresponding to the first video on a display unit of the electric device based on the at least one play parameter further comprises:
    generating the play progress bar based on the at least one play parameter, displaying the play progress bar between the first video timing and the second video timing in the first pattern, and displaying the play progress bar before the first video timing and after the second video timing in the second pattern.

3. An electric device comprising:
    a first acquiring unit, configured to acquire at least one play parameter for characterizing a playing history of a first video from the network side and/or a storage unit of the electric device; and
    a first processing unit, configured to generate and display a play progress bar corresponding to the first video on a display unit of the electric device based on the at least one play parameter,
    wherein the play progress bar at least has a first portion displayed in a first pattern and a second portion displayed in a second pattern different from the first pattern,
    wherein the first acquiring unit further comprises:
    a first acquiring sub-unit, configured to acquire a first operation parameter for characterizing a first operation of a user during the play of the first video from the network side and/or the storage unit, the first operation parameter comprising a first video timing and a second video timing after the first video timing;
    a second acquiring sub-unit, configured to acquire a number of times for which the first video has been played;
    a third acquiring sub-unit, configured to acquire a number of times for which the first operation has been performed during the period between a third video timing and a fourth video timing; and
    a fourth acquiring sub-unit, configured to acquire a first ratio of the playing number of times to the performing number of times, wherein the first video timing is a video playing timing at which the user starts performing the first operation, the second video timing is a video playing timing at which the user stops performing the first operation, the third video timing is a video playing timing before the first video timing, and the forth video timing is a video playing timing after the first video timing and before the second video timing, and wherein the first processing unit further comprises:

a first determination sub-unit, configured to determine whether the first ratio is larger than a predefined ratio, to obtain a first determination result; and a second processing sub-unit, configured to generate the play progress bar when the first determination result indicates that the first ratio is equal to or larger than the predefined ratio, to display the play progress bar between the first video timing and the second video timing in the first pattern, and to display the play progress bar before the first video timing and after the second video timing in the second pattern.

4. The electric device of claim 3, wherein the first processing unit further comprises:

a play progress bar processing unit, configured to generate the play progress bar based on the at least one play parameter, to display the play progress bar between the first video timing and the second video timing in the first pattern, and to display the play progress bar before the first video timing and after the second video timing in the second pattern.

\* \* \* \* \*